(No Model.)
T. R. WILDS.
FEEDER FOR SELF BINDING HARVESTERS.
No. 434,854. Patented Aug. 19, 1890.
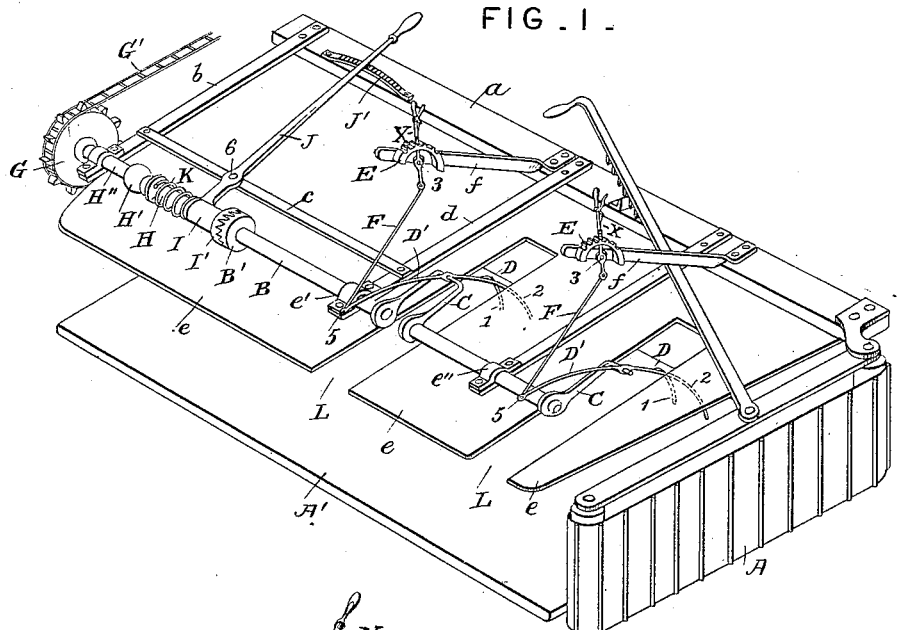
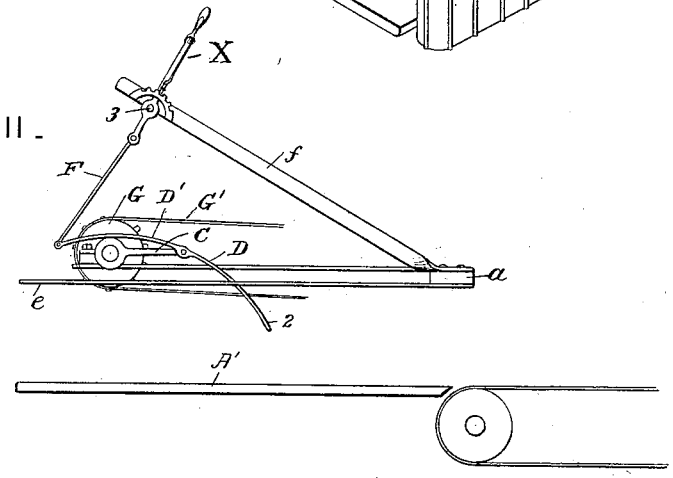
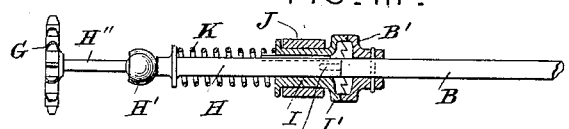
Attest: Geo. T. Smallwood.
W. E. Knight.
Inventor
Thaddeus R. Wilds
By Knight Bros.
attys.

UNITED STATES PATENT OFFICE.

THADDEUS R. WILDS, OF SCOVILLE, (DAKOTA TERRITORY,) NORTH DAKOTA.

FEEDER FOR SELF-BINDING HARVESTERS.

SPECIFICATION forming part of Letters Patent No. 434,854, dated August 19, 1890.

Application filed September 26, 1889. Serial No. 325,141. (No model.)

*To all whom it may concern:*

Be it known that I, THADDEUS R. WILDS, a citizen of the United States, residing at Scoville, Ransom county, North Dakota, have invented certain new and useful Improvements in Feeders for Self-Binding Harvesters; and I do hereby declare that the following specification, taken in connection with the accompanying drawings, which form a part thereof, is a full, clear, and exact description of my improvements, such as will enable those skilled in the art to which it appertains to make and use the same.

My invention relates to improvements in devices for preventing self-binding harvesters from clogging by keeping a steady and even feed of straw down the deck to the binder. In binding very short grain there has been much difficulty encountered, caused by the grain falling on the canvas or apron in a heterogeneous mass instead of straight, as is the case when the grain is long, and if this mass is allowed to pass down the deck to the binder it is very clear that the binding process will be unsuccessful. To remedy this defect in self-binding harvesters and adapt them for binding short grain is the object of my invention.

With this end in view my improvement consists in independently-adjustable feeders or forks on a revolving shaft for advancing the straw along the deck to the binder of a self-binding harvesting-machine. The shaft is provided at suitable intervals with U-shaped cranks, which support the straw-advancing forks just over the binder-deck near the binder.

In order that my invention may be fully understood, I will first describe the same with reference to the accompanying drawings, and then more particularly point out the novel features in the claims.

In said drawings, Figure I is a perspective view of my improved feeder. Fig. II is a side view of the same. Fig. III is a detail view.

$a$, $b$, $c$, and $d$ are pieces forming the framework of the hood overhanging the grain or binder deck, and $e$ is the top casing or hood.

A is the ordinary endless belt, adjustably attached at one side of the feeder-trough for lining up the cut ends of the straw, and A' is the binder deck or floor of the feeder-trough.

B is a revoluble shaft having suitable bearings at $e'$ and $e''$ on the hood, and is provided at suitable intervals with crank-arms C C. Journaled on these crank-arms are forks D, having tines 1 2 and supporting-arms D'.

$ff$ are two stationary pieces attached to the cross-piece $a$ and supporting at their outer ends segment-racks E. The adjusting-levers X are pivoted at 3 on the arms $f$, and have extensions below the pivots for forming connections with pitmen F, which are attached at 5 to the upper ends of supporting-arms D'. Each of these levers X is provided with the well-known locking-dog and spring hand-lever for operating it. By this arrangement it is obvious that the pitch of each feeder or fork can be adjusted separately, so as to agree with the varying conditions of the grain.

G is a sprocket-wheel mounted on a shaft H supported in suitable bearings on one side of the hood and having connection with the power-shaft by sprocket-chain G'.

H is a detached piece of shaft having universal gimbal-joint connection H' with the shaft H'' of sprocket-wheel G, and spline-connection with a sleeve I, the object of the gimbal-joint being to allow of the shaft H'' being fastened out of line with shaft B when desired. This shaft H is journaled at its inner end upon a small bearing-pin $h$, formed on the end of shaft B, and has a gimbal-joint connection H' with shaft H'' and supports on its inner end the sleeve I. The sleeve I has on one end a ratchet-disk I' for engaging with a similar disk B', secured on shaft B, and on its inner surface a groove for engagement with the spline on shaft H. This construction is clearly shown in Fig. III. To this sleeve I is connected by a collar one end of a lever J, which is pivoted at 6 on frame-piece $c$, and has near its outer or handle end a knife-edge adapted to engage with a rack J', attached to the frame-piece $a$. This lever J shifts the ratchet-disk I' on sleeve I out of or into engagement with ratchet-disk B' on shaft B, against the action of a spring K, held in place by a collar on the shaft H, and an annular rim on sleeve I. The sleeve is held out of engagement against the action of the spring by the engagement of the knife-edge on lever J with the rack.

Long slits L are formed in the casing or hood $e$ to allow ample room for the operation of the feeders. Any number of feeders may be used, but I have found two to work most satisfactorily.

I have found by experiment that the head ends of the grain pack more readily than the butt-ends, and for this reason I have arranged the packer-forks on that side of the binder-deck on which the butt-ends rest. Either one or both of the packer-forks may be used at the same time, and when only one is used I prefer to use the forward one, for I have found in practice that this produces the best results.

Having thus described my invention, what I desire to secure by Letters Patent is—

1. In a self-binding harvester-machine, the combination, with a series of oscillating feeders or packers, of independently-movable adjusting-levers connected to the respective feeders or packers, whereby the pitch of the several feeders may be separately adjusted, as herein set forth.

2. In a self-binding harvester-machine, the separately-adjustable feeders D, mounted on a common crank-shaft B, and having independent levers X connected with the respective feeders by pitmen F for controlling said feeders, as herein set forth.

THADDEUS R. WILDS.

Witnesses:
ULYSSES HERTIG,
R. N. STEVENS.